(12) United States Patent
Huang et al.

(10) Patent No.: US 7,708,419 B2
(45) Date of Patent: May 4, 2010

(54) AMBIENT LIGHT SYSTEM AND METHOD THEREOF

(75) Inventors: Ling-Shiou Huang, Tainan County (TW); Lin-Kai Bu, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 142 days.

(21) Appl. No.: 11/681,206

(22) Filed: Mar. 2, 2007

(65) Prior Publication Data

US 2008/0212306 A1    Sep. 4, 2008

(51) Int. Cl.
*G09F 13/04*    (2006.01)

(52) U.S. Cl. .................. 362/97.2; 362/276; 348/602; 340/815.46

(58) Field of Classification Search .......... 362/276, 362/802, 97.1, 97.2; 348/602–603; 340/815.46; 349/116; 345/102
See application file for complete search history.

(56) References Cited

U.S. PATENT DOCUMENTS

| | | | | | |
|---|---|---|---|---|---|
| 4,321,622 | A | * | 3/1982 | Jerome et al. ............... | 386/100 |
| 4,538,140 | A | * | 8/1985 | Prestel ........................ | 340/556 |
| 4,835,556 | A | * | 5/1989 | Spector ....................... | 353/15 |
| 6,046,724 | A | * | 4/2000 | Hvass ......................... | 345/600 |
| 6,339,429 | B1 | * | 1/2002 | Schug ......................... | 345/589 |
| 6,760,454 | B1 | * | 7/2004 | Shreve et al. ............... | 381/110 |
| 6,778,226 | B1 | * | 8/2004 | Eshelman et al. .......... | 348/836 |
| 7,211,958 | B2 | * | 5/2007 | Maurer et ................... | 315/123 |
| 7,459,623 | B2 | * | 12/2008 | Robertson ................. | 84/464 R |

* cited by examiner

*Primary Examiner*—Thomas M Sember
(74) *Attorney, Agent, or Firm*—Thomas, Kayden, Horstemeyer & Risley

(57) ABSTRACT

An ambient light system applied in a TV including a display panel, a loudspeaker and a plurality of ambient light sources includes an audio level detector, a pattern generator, and an ambient light controller. The audio level detector detects the level of an input audio signal to obtain a detected level. The pattern generator generates an ambient light pattern based on the detected level by reference to a selected operation mode. The ambient light controller controls the intensity of one or more ambient light sources based on the ambient light pattern.

6 Claims, 2 Drawing Sheets

AMBIENT LIGHT SYSTEM AND METHOD THEREOF

BACKGROUND OF THE INVENTION

1. Field of the Invention

The invention relates in general to an ambient light system, and more particularly to an ambient light system capable of providing different ambient light effect in response to the intensity of an input signal.

2. Description of the Related Art

Liquid crystal display (LCD) TV recently has been widely used in home TV. A traditional LCD TV includes a LCD display and loudspeaker for displaying the video and playing the audio signal respectively. However, the traditional LCD TV cannot provide ambient light and the ambient effect on the video frame in response to the audio signal. Such that, how to design a LCD TV capable of providing ambient light and ambient effect in response to the audio signal has become an imminent goal to achieve.

SUMMARY OF THE INVENTION

The invention is directed to an ambient light system and method thereof capable of overcoming the disadvantage of a conventional LCD display not capable of providing ambient light and ambient effect in response to the audio signal, and making the LCD TV using the ambient light system of the invention capable of providing ambient light and ambient effect in response to the audio signal.

According to a first aspect of the present invention, an ambient light system is provided. The ambient light system applied in a TV having a display panel, a loudspeaker and a plurality of ambient light sources includes an audio level detector, a pattern generator, and an ambient light controller. The audio level detector detects the level of an input audio signal to obtain a detected level. The pattern generator generates an ambient light pattern based on the detected level by reference to a selected operation mode. The ambient light controller controls the intensity of one or more ambient light sources based on the ambient light pattern.

According to a second aspect of the present invention, a method for generating an ambient light to drive a plurality of ambient light sources in a TV is provided. The method includes the following steps. First, level of an input audio signal is detected to generate a detected level. Next, whether the detected level is over a threshold value is determined. Afterward, when the detected level is over the threshold value, a driving signal is obtained based on a first ambient light pattern corresponding to a selected operation mode, so as to generate the ambient light.

The invention will become apparent from the following detailed description of the preferred but non-limiting embodiments. The following description is made with reference to the accompanying drawings.

DETAILED DESCRIPTION OF THE INVENTION

Figure 1:
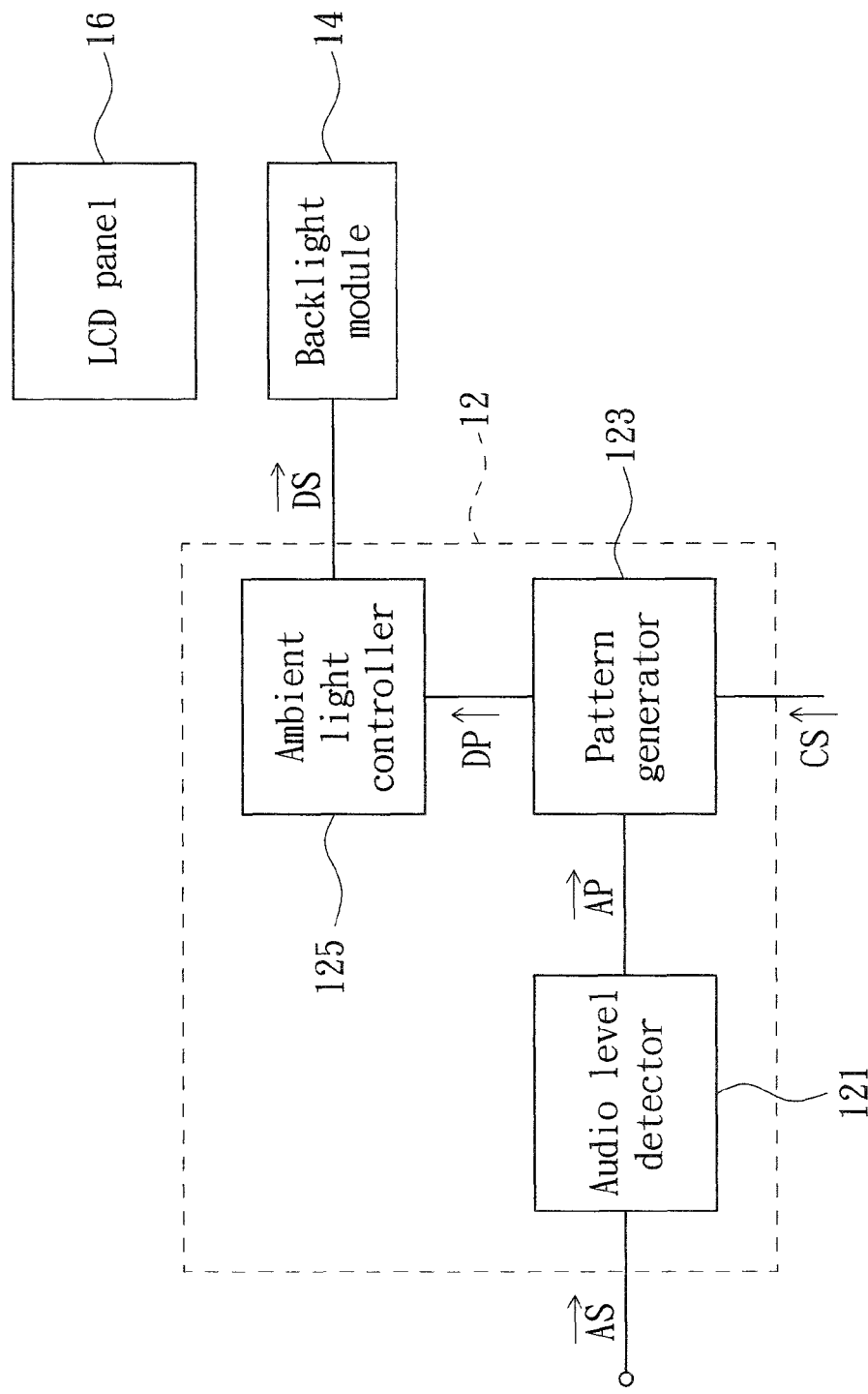
FIG. 1 is a block diagram of an ambient light system according to the preferred embodiment of the invention.

Referring to FIG. 1, a block diagram of an ambient light system according to the preferred embodiment of the invention is shown. The ambient light system 12 is applied in a liquid crystal display (LCD) TV 10 including a LCD display panel 16, a number of ambient light sources, and a loudspeaker (Not shown). In this embodiment, the ambient light sources are exemplified as the backlight sources of the backlight module 14 collocated with the LCD display panel 16.

The ambient light system 12 includes an audio level detector 121, a pattern generator 123, and a ambient light controller 125. The audio level detector 121 is for receiving a input audio signal AS and detecting the intensity thereof to obtain a detected level AP. The pattern generator 123 is for generating a ambient light pattern DP based on the detected level AP by reference to a selected operation mode of the pattern generator 123. The ambient light controller 125 is for providing a driving signal DS to control the intensity of one or more ambient light sources based on the ambient light pattern DP, so as to generate ambient light and ambient effect.

Before the user enables the ambient light function of the ambient light system 12, the ambient light controller 125 is substantially a driving unit of the backlight module 14 for continuously providing stable driving signal DS to drive the backlight sources in the backlight module 14 providing stable backlight.

When the user enables the ambient light function of the ambient light system 12, the pattern generator 123 is for determining the detected level AP is over a threshold value. In the present embodiment, the threshold value is a user-define value. When the detected level AP is over the threshold value, the pattern generator 123 is for providing the ambient light pattern DP based on the selected operation mode of the pattern generator 123 to the ambient light controller 125, so as to generate the driving signal DS to drive the corresponding backlight sources in the backlight module 14.

When the detected level is not over the threshold value, the pattern generator 123 does not provide any ambient light pattern. Such that, the ambient light controller 125 is substantially the driving unit of the backlight module 14 for driving the backlight sources in the backlight module 14 providing stable backlight. The pattern generator 123 of the present embodiment, for example, includes a temporal ambient mode for providing the corresponding temporal ambient light pattern in response to the detected level AP. The temporal ambient mode is for controlling the ambient light sources generating at least two ambient light with different luminance, so as to provide a flickering ambient light. Such that, the user can see the ambient effect that the ambient light flickering at least once in response to a huge rise in the audio signal volume.

In the present embodiment, the pattern generator 123 is exemplified to determine whether the detected level AP is over one threshold value, however, the pattern generator 123 can further determine the detected level AP with two or more threshold value, so as to provide two or more different ambient light pattern DP as the detected level AP is over those threshold value, respectively.

In the present embodiment, the pattern generator 123 is exemplified to include the temporal ambient mode, however, the pattern generator 123 can further include two or more ambient mode to provide different ambient light patterns. For example, the pattern generator 123 further includes a spatial ambient mode, for providing corresponding spatial ambient light pattern to the ambient light controller 125 to control the ambient light sources generating ambient lights with different luminance, so as to provide a non-uniform ambient lights.

When the pattern generator 123 includes two or more ambient modes, the pattern generator 123 further receives a select signal CS, and select one ambient modes as the selected operation mode to provide the corresponding ambient light pattern.

The audio level detector 121 of the present embodiment is, for example, accumulating the intensity of a plurality of spectrum frequencies of the input audio signal AS to obtain the detected level AP.

Figure 2:
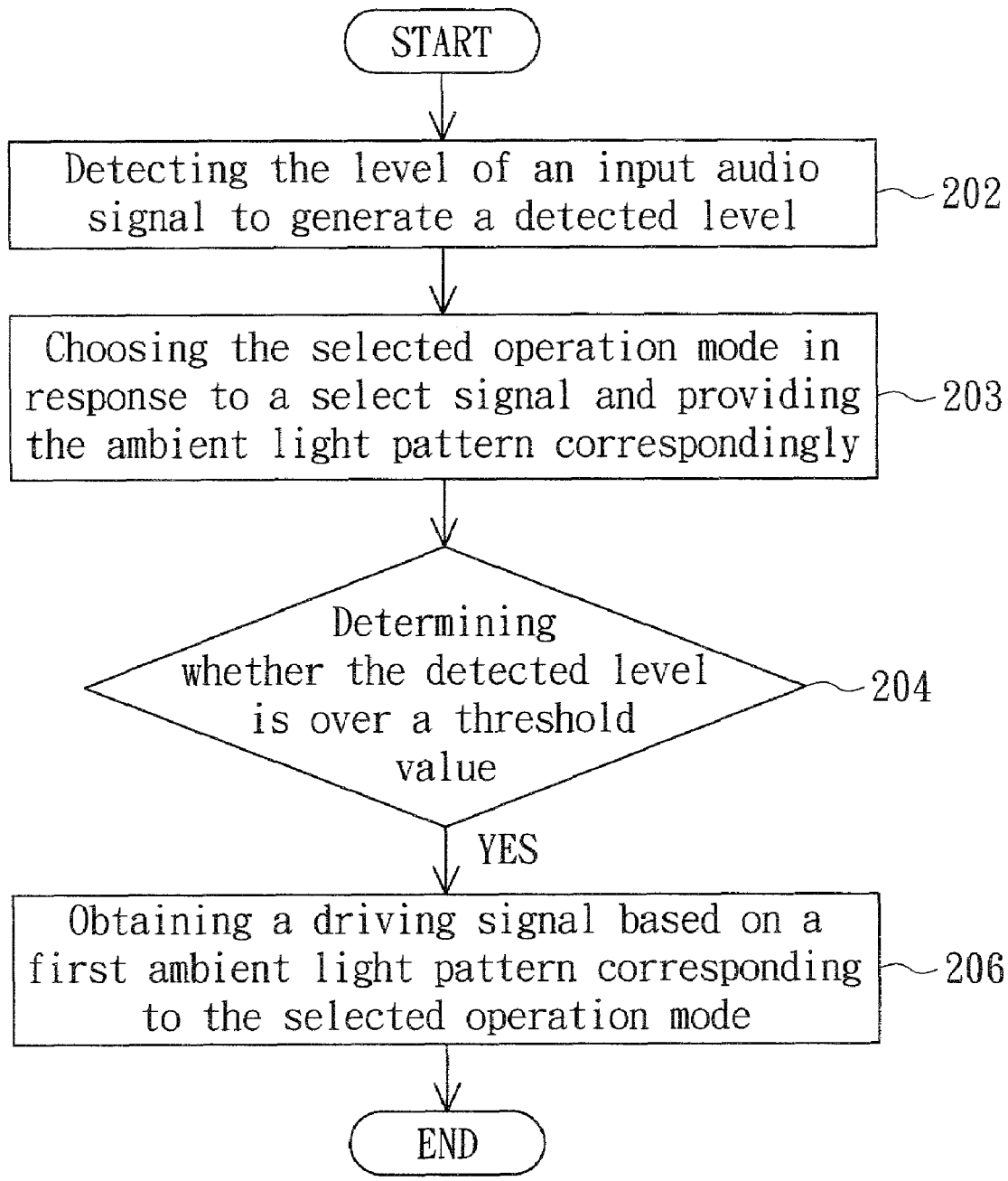
FIG. 2 is a flow chart of an method for generating an ambient light according to the preferred embodiment of the invention.

Referring to FIG. 2, a flow chart of a method for generating an ambient light according to the preferred embodiment of the invention is shown. Firstly, the method begins at steps 202, the audio level detector 121 detects the level of the input audio signal AS and generates the detected level AP. Next, the method proceeds to steps 204, the pattern generator 123 determines whether the detected level AP is over a threshold value. Then, the method proceeds to steps 206, when the detected level AP is over the threshold value, the pattern generator 123 provides a ambient light pattern based on the selected operation mode thereof to the ambient light controller 125. The ambient light controller 125 obtains the driving signal DS, so as to drive the backlight sources to generate the ambient light.

When the pattern generator 123 includes two or more ambient modes, the method for generating the ambient light according to the present embodiment further includes steps 203, the pattern generator 123 choose the selected operation mode out of those ambient mode in response to a select signal and providing the corresponding ambient light pattern to the ambient light controller 125 to generate the ambient light.

The ambient light system of the present embodiment is for providing a ambient light pattern in response to the detected audio level and the threshold value to the ambient light controller, so as to generate the ambient light and the ambient effect. Such that, the ambient light system of the present embodiment is capable of effectively overcoming the disadvantage of a conventional LCD display not capable of providing ambient light and ambient effect in response to the audio signal, and making the LCD TV using the ambient light system of the invention capable of providing ambient light and ambient effect in response to the audio signal.

The pattern generator in the ambient light system of the present embodiment can further include at least two ambient mode, for example, the temporal and spatial ambient modes, to provide at least two ambient light patterns. Such that, the ambient light system of the present embodiment is further advantageously capable of providing many kinds of ambient light and ambient effects flexibly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An ambient light system for a TV having a liquid crystal display (LCD) panel, the ambient light system comprising:
   a plurality of ambient light sources, the ambient light sources implemented with a plurality of backlight sources included in a backlight module located at a back of the LCD panel;
   an audio level detector detecting a level of an input audio signal to be played by a loudspeaker of the TV to obtain a detected level, the level of the input audio signal corresponding to a volume of the input audio signal;
   a pattern generator generating an ambient light pattern by reference to a selected operation mode when the detected level satisfies a predetermined condition; and
   an ambient light controller providing a control signal to control the intensity of one or more of the ambient light sources based on the ambient light pattern to provide ambient light at the back of the display panel, wherein,
   the selected operation mode is a temporal ambient mode or a spatial ambient mode, and the temporal ambient mode provides the corresponding ambient light pattern to the ambient light controller for controlling the ambient light sources generating ambient lights with different luminance at different time, so as to provide a flickering ambient light at the back of the LCD panel; and
   the spatial ambient mode provides the corresponding ambient light pattern to the ambient light controller for controlling the ambient light sources generating ambient lights with different luminance at different locations, so as to provide a non-uniform ambient light at the back of the LCD panel.

2. The ambient light system according to claim 1, wherein the pattern generator selects the selected operation mode in response to a select signal.

3. The ambient light system according to claim 1, wherein the pattern generator determines whether the detected level is over a threshold value, when the detected level is over the threshold value, the pattern generator provides the ambient light pattern corresponding to the selected operation mode to the ambient light controller.

4. The ambient light system according to claim 1, wherein the audio level detector is for accumulating the intensity of a plurality of spectrum frequencies of the input audio signal to obtain the detected level.

5. A method for driving a plurality of ambient light sources in a TV to generate ambient light, the method comprising the following steps of:
   detecting the level of an input audio signal to be played by the loudspeaker to generate a detected level;
   determining whether the detected level is over a threshold value; and
   when the detected level is over the threshold value, obtaining a driving signal to drive the ambient light sources based on a first ambient light pattern corresponding to a selected operation mode, so as to generate the ambient light, wherein,
   the ambient light sources are backlight sources included in a backlight module of a liquid crystal display (LCD) panel;
   the selected operation mode is a temporal ambient mode or a spatial ambient mode, and when the selected operation mode is the temporal ambient mode, the controlling step controls the ambient light sources generating ambient lights with different luminance at respective different time, so as to provide a flickering ambient light at the back of the LCD panel; and
   when the selected operation mode is the spatial ambient mode, the controlling steps controls the ambient light sources generating ambient lights with different luminance at different locations, so as to provide a non-uniform ambient light at the back of the LCD panel.

6. The method according to claim 5, further comprising:
   choosing the selected operation mode out of a first ambient mode and a second ambient mode in response to a select signal, so as to obtain the ambient light pattern corresponding to the selected operation mode.

* * * * *